United States Patent [19]
Kaiser et al.

[11] Patent Number: 5,116,135
[45] Date of Patent: May 26, 1992

[54] EXTRUDER HOUSING FOR A DOUBLE-WORM EXTRUDER AND METHOD OF MAKING SAME

[75] Inventors: Hartmut Kaiser, Mülheim a. d. Ruhr.; Peter Lülsdorf, Niederkassel-Mondorf, both of Fed. Rep. of Germany

[73] Assignee: Reifenhauser GmbH & Co. Maschinenfabrik, Troisdorf, Fed. Rep. of Germany

[21] Appl. No.: 607,161

[22] Filed: Oct. 31, 1990

[30] Foreign Application Priority Data

Nov. 2, 1989 [DE] Fed. Rep. of Germany ....... 3936438

[51] Int. Cl.⁵ ............................. B01F 7/08; B29B 1/10
[52] U.S. Cl. ........................................ 366/349; 366/84
[58] Field of Search ................ 366/83, 84, 85, 301, 366/323, 79, 297, 348, 349; 425/200, 207, 208

[56] References Cited

U.S. PATENT DOCUMENTS

| | | | |
|---|---|---|---|
| 4,117,583 | 10/1978 | Gnadig | 366/83 |
| 4,127,331 | 11/1978 | Herbert | 366/84 |
| 4,247,206 | 1/1981 | Zahradnik | 366/323 |
| 4,773,763 | 9/1988 | Weber | 366/83 |

*Primary Examiner*—Robert W. Jenkins
*Attorney, Agent, or Firm*—Herbert Dubno

[57] ABSTRACT

An extruder-housing part for a double-worm extruder for the plastification of thermoplastic synthetic resin and plastic mixtures has two chambers for receiving the worms and forming a figure eight cavity. A wear-resistant material formed as a hard-phase layer is provided to line the chambers. The extruder-housing part is a one-piece seamless structure with an isotropic lattice of powder metallurgical origin with a hot isostatic pressing configuration.

5 Claims, 3 Drawing Sheets

| QUALITY | HARDNESS HRc at Rt 400°C | | ALLOY TYPE | PROPERTIES | | USE | |
|---|---|---|---|---|---|---|---|
| | | | | WEAR RESISTANCE | CORROSION RESISTANCE | CYLINDER | WORM |
| RS 12H | 53 | 45 | Co-BASE WITH Cr, W | xx | xxxx | + | + |
| RS1H | 61 | 54 | | xxx | xxxx | ++ | + |
| RTCo H-SPECIAL | 64 | 59 | | xxxx | xxxx | + | |
| R150H | 58 | 55 | Ni-BASE WITH Cr,Mo,W,B | xxx | xxxx | + | + |
| R123H | 60-62 | 55 | Fe-BASE WITH Cr,Mo,V HARDENED | xxx | xxx | ++ | ++ |
| R124H | MAX.64 | 57 | | xxx | x | + | |
| R124H | 66-68 | 62-63 | Fe-BASE WITH Cr, Ni, Mo, V, B | xxx | x | ++ | |
| R121H2 | 68-70 | 64-65 | | xxxx | x | + | |
| R122H | 55-68 | 62-63 | | xxx | xx | + | |

EXPLANATION
xxxx — EXTRAORDINARY
xxx — VERY GOOD
xx — GOOD
x — SATISFACTORY WITH A FEW LIMITATIONS

FIG. 4

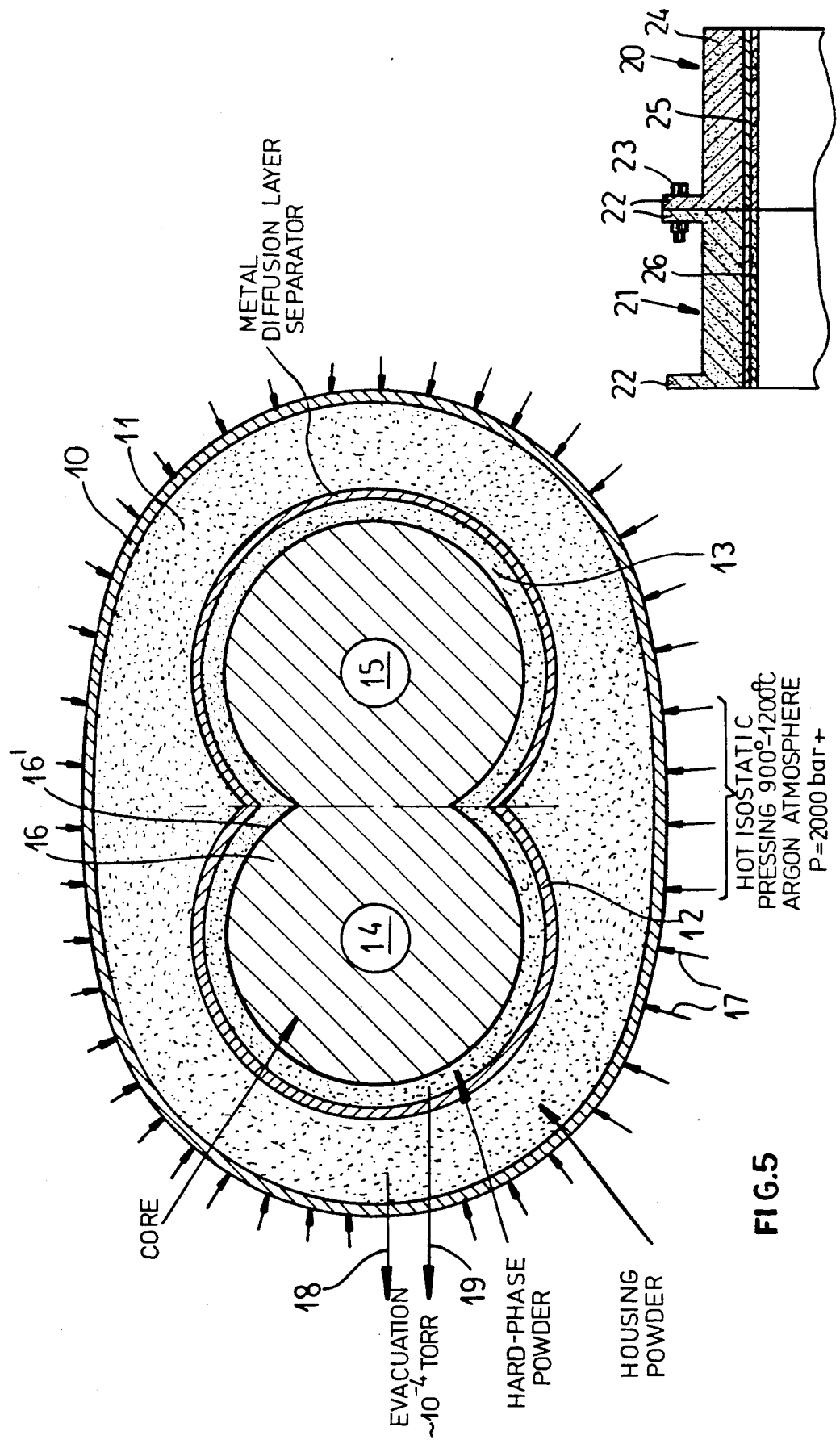

5,116,135

EXTRUDER HOUSING FOR A DOUBLE-WORM EXTRUDER AND METHOD OF MAKING SAME

FIELD OF THE INVENTION

Our present invention relates to an extruder housing for a double-worm extruder of the type used in the processing of thermoplastic synthetic resins and synthetic resin or plastic mixtures. The invention also relates to a method of making such a housing or a part thereof.

BACKGROUND OF THE INVENTION

Double-worm extruders generally comprise an elongated housing formed at one end with an inlet for the thermoplastic material or compositions containing plastic materials which are to be masticated and subjected to mixing and shear in the extruder by a pair of worms received within respective worm chambers extending the length of the housing. At the opposite end of the housing, a liquefied or plastified material is extruded by the worm.

The extruder housing has its worm chambers formed therein so as to constitute a figure eight configuration in cross section.

There have been increasing efforts in recent years to augment the proportion of mineral or oxidic fillers in thermoplastic compositions.

For example, 50% or more of a composition to be subjected to thermoplastification in the extruder may be composed of such fillers. Indeed, it is possible to provide compositions in which the thermoplastic material is present only as a binder, for example in an amount up to about 20%, while the balance of the composition is abrasive mineral and oxidic substances. These compositions may be used in the fabrication of synthetic-resin-bonded ceramics.

All such material compositions are highly abrasive and the operation of the double-worm extruder can give rise to significant deterioration of the surfaces of the chambers exposed to the action of the material. It is possible to reduce the wear and abrasive attack of the material processed by coating the surfaces of the chambers with a hard-phase layer or so-called hard-facing material.

To permit the hard facing of the chambers of the extruder, generally the extruder housing is composed of a plurality of parts which are joined together along longitudinally-extending seams. For example, the housing may comprise two halves which are joined together by electron-beam welding along a longitudinal median plane. The result, of course, is that such housings have undesirable weld seams which are particularly sensitive, for example, to the high pressures which must be generated in the extruder.

Other techniques, apart from hard-facing using welding technology, for example, centrifugal coating, may also be used to apply the hard-phase layer to the body of the housing. Such techniques have been found to be expensive to use, largely because of the extensive machining required of the cast or forged body.

In the case of facing techniques, for example, it is necessary not only to accurately machine the chamber walls, but also to polish them. Indeed, the harder the hard-phase layer, the more expensive and complex are the machining techniques required to provide the chamber walls.

OBJECTS OF THE INVENTION

It is, therefore, the principal object of the present invention to provide an improved extruder housing part which can be fabricated at relatively low cost and which is also free from other disadvantages of earlier systems.

Another object of this invention is to provide an improved method of making an extruder housing part for a double-worm extruder.

Still another object of the invention is to provide an improved method of making extruder housing parts for a double-worm extruder and the improved parts thus made whereby drawbacks of earlier systems are obviated.

SUMMARY OF THE INVENTION

These objects and others which will become apparent hereinafter are attained, in accordance with the invention, with an extruder housing part for a double-worm extruder which comprises a unitary seamless body formed with two adjoining chambers adapted to receive respective worms of a double-worm extruder, the body being formed with an outer layer of hot isostatically pressed powder of a housing-forming powder-metallurgical material and an inner hard-phase layer delimiting the chambers and composed of hot isostatically pressed hard-phase powder-metallurgical material, and a diffusion layer between the inner and outer layers and bonded thereto, the inner and outer layers having isotropic lattice structures of powder-metallurgical origin with hot-isostatic-pressing texture.

Advantageously, the diffusion layer comprises a metallic partition between the inner and outer layers and into which both the housing-forming powder-metallurgical material and the hard-phase powder-metallurgical material are diffused.

In other words, the extruder housing part of the invention is a one-piece seamless housing part which in its outer region is composed of the housing material and at its inner part delimiting the worm chambers is composed of a hard-phase powder metallurgical material so that in both regions an isotropic lattice structure of powder-metallurgical origin and an HIP texture is formed with the housing material region and the hard-phase region being connected by the diffusion layer.

In a preferred embodiment of the invention, the diffusion layer is formed by a partition into which the housing material diffuses and the hard-phase material diffuses.

The term "HIP" is here used to refer to the known technology of hot-isostatic pressing. The lattice structure which results from it is characterized by a high degree of fineness and a high degree of isotropy.

Reference is made to the HIP texture since, in the completed body, the normal forging texture associated with a forged body cannot be discerned, micropores practically cannot be detected and a homogeneous isotropy prevails.

The extruder housing part of the invention is fabricated by HIP technology Both machining and polishing operations within the worm chambers can be reduced or even completely eliminated so that any necessary machining can be confined to the exterior of the housing when the hot-isostatic pressing of the materials is effected against a core of the configuration of the two chambers and of a sufficiently polished surface character. Any minor fine polishing and lapping of the chamber walls is of a trivial nature.

In accordance with a preferred embodiment of the invention, the two worm chambers are of a conical character to accommodate conical worms. With the present invention using the HIP technique, even conical hard-phase layers can be formed.

According to another feature of the invention, the hard-phase layer region extends over the entire length of the housing with substantially a constant layer thickness.

The extruder housing part of the invention can form the entire extruder housing or can be one of several seamless parts joined together, e.g. by flange connections for assembly into the housing.

As has already been indicated, the HIP technology is known. However, by using this technology for the production of extruder housing parts in the ways indicated, it is possible to fabricate extruder housings in which the two worm chambers are conical and the system is free from longitudinal seams. Of course, conical cores and conical partitions are also required.

The method of the invention can comprise the steps of (a) forming an isostatic pressing powder-metallurgy mold between an outer sheet-metal shell and a massive steel core having a figure-eight cross section and subdividing the mold by a steel partition delimiting an inner compartment with the core and an outer compartment with the shell;

(b) filling the inner compartment with a pulverulent hard-phase-forming powder-metallurgical material and the outer compartment with a pulverulent housing-forming powder-metallurgical material;

(c) evacuating the compartments; and (d) subjecting the mold to hot isostatic pressing to form the materials into the body and cause diffusion of the materials into the partition to transform the partition into a diffusion layer bonded between an inner hard-phase layer and an outer housing layer of the body.

When the housing parts are assembled with other similar housing parts having corresponding layers, they are joined end to end with one another.

The pulverulent materials are introduced into the respective compartments with a bulk density of 65% of the density of the respective materials. The term "bulk density" refers to the density of the powder which can be packed into the spaced in terms of grams per cc of volume filled by the powder. The density of the respective material is, of course, the density of the solid.

The housing material can be steel or steel alloys and the partition can also be composed of steel. The hard-phase material can be a cobalt, nickel or iron-based alloy hardened with tungsten, chromium, molybdenum, boron or vanadium and combinations thereof to resist abrasion by the fillers contained in the thermoplastic material.

The surfaces of the chambers are formed with high precision so that a minimum of machining of the internal surfaces is required.

Advantageously, the mold is hot-isostatically pressed at a pressure of at least 2000 bar and the compartments are evacuated to about $10^{-4}$ torr. The hot-isostatic pressing can be carried out at a temperature of 900 to 1200° C.

BRIEF DESCRIPTION OF THE DRAWING

The above and other objects, features and advantages of the present invention will become more readily apparent from the following description, reference being made to the accompanying drawing in which:

FIG. 4 is a table representing examples of the invention;

FIG. 5 is a cross sectional view illustrating the method of the invention; and

FIG. 6 is a fragmentary cross sectional view showing the assembly of seamless housing parts according to the invention into a completed extruder housing.

SPECIFIC DESCRIPTION

Figure 1:
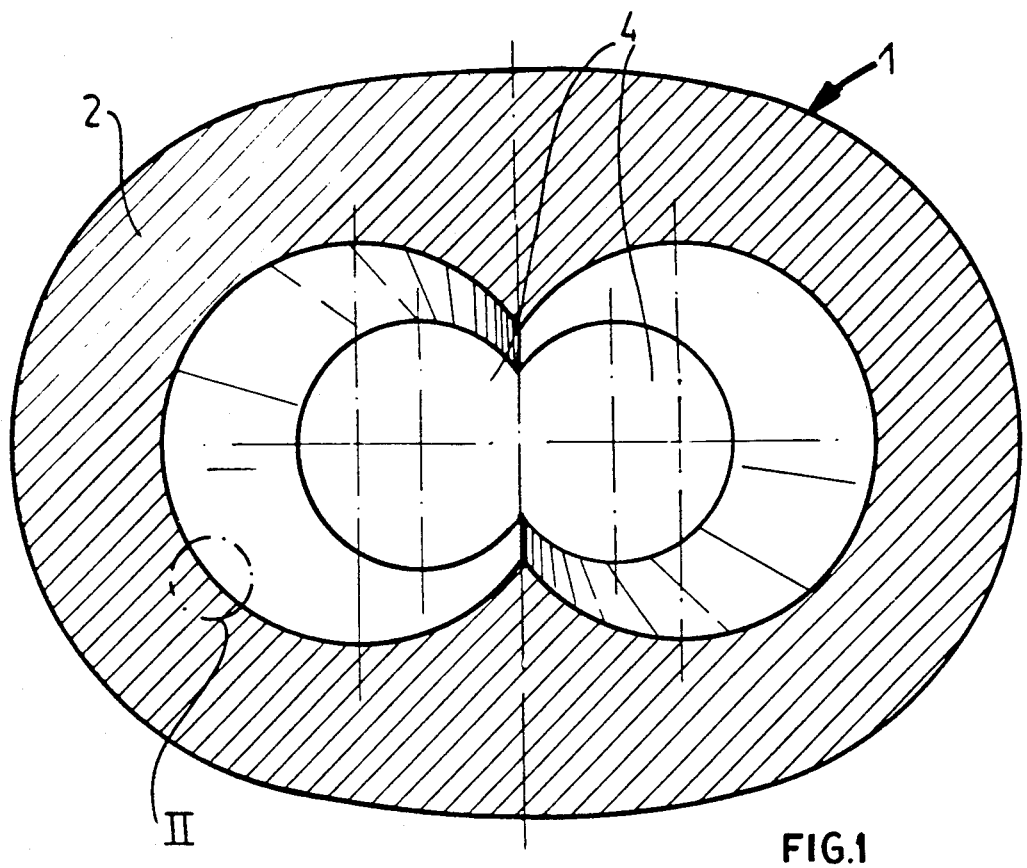
FIG. 1 is a diagrammatic cross section through an extruder housing according to the invention.
Figure 2:
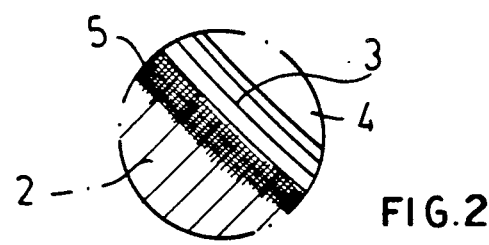
FIG. 2 is a detail view of the region II of FIG. 1.
Figure 3:
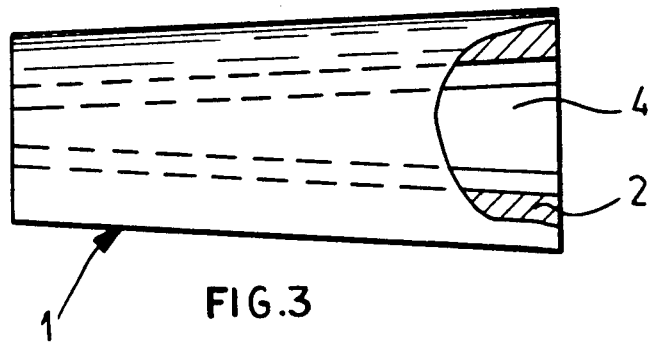
FIG. 3 is a side elevational view, partly broken away, of the extruder housing.

The extruder housing part 1 shown in FIGS. 1-3 is intended for a double-worm extruder for the plastification of thermoplastic synthetic resins and plastic-containing mixtures such as those described above. It is comprised of a housing material 2 and a wear-resistant material 3. It has two chambers 4 for receiving the respective extruder worms or screws (not shown) and thus creating a figure eight passage through the seamless body. The wear-resistant material 3 is formed as a hard-phase layer lining the chambers and constituting the chamber walls, as has been illustrated in the detail view of FIG. 2.

The one-piece seamless structure has in the housing material region 2, as well as in the hard-phase region 3, an isotropic lattice structure with HIP texture. In addition, a highly isotropic diffusion layer 5 is provided between the layer 2 and the layer 3.

The hard-phase layer 3 is of uniform layer thickness over the entire length of the extruder housing. Alternatively, seamless housing parts 20, 21, etc. can be formed with respective housing layers 24, diffusion layers 25 and hard-phase layers 26, and these housing members can be formed with flanges 22 which are interconnected by bolts or by some other flange-connection technique.

FIG. 3 illustrates the embodiment of the invention in which the entire housing is formed in one piece. The table of FIG. 4 shows a number of wear-resistant materials adapted to form the hard-phase layers utilizing steel as the outer body. The table is deemed to speak for itself. It will also be apparent from the table that the extruder screws or worms can be provided at least on their external surfaces exposed to the material to be masticated in the extruder with corresponding hard-phase materials.

The thickness of the hard-phase layer may range from, for example, 10 micrometers to 3 cm, for example, and the thickness of the sheet metal inserted as a basis for the diffusion layer can be say, 10 to 20 mm.

The powders used in the powder metallurgical processes can be very fine, i.e. with a particle size in the micrometer to mm range, say, 2 micrometers to 1 mm.

As can be seen from FIG. 5, the core 16 can be provided with a highly polished outer surface 16' and formed with passages 14 and 15 for circulating a coolant therethrough.

The inner compartment 13 is defined between this core 16 and a sheet metal shell 12 of steel ultimately to form the diffusion layer B previously described. The hard-phase pulverulent material is introduced into this compartment. The material can be a powder of any of the alloy types listed in FIG. 4.

The packing density of the powder in the compartment 13 should be about 65% of the solid density of the alloy.

Into a compartment 11 defined between the sheet metal separator 12 and an outer sheet metal shell 10, we introduce the powder of the housing material, e.g. a steel. This powder is also introduced with a packing density of 65%. In both cases a knocking up may be used to compact the powder.

The compartments are then evacuated as represented at 18 and 19 to $10^{-4}$ torr and the assembly is then subjected to hot isostatic pressing as represented by the arrows 11 at a temperature between 900° to 1200° C. in an argon atmosphere and with a pressure of upwards of 2,000 bar while cooling water is circulated through the core 16. When the particles have fused together, and material from each layer had diffused into the partition, the core is withdrawn from the body. In a specific example, the thickness of the hard-phase layer was 1 cm, the thickness of the diffusion layer was 3 mm, the pressing pressure was 2200 bar and the pressing temperature was 1150° C. The hard-phase material was a chromium-tungsten alloy of cobalt.

We claim:

1. An extruder housing part for a double-worm extruder comprising a unitary seamless body formed with two adjoining chambers adapted to receive respective worms of a double-worm extruder, said body being formed with an outer layer of hot isostatically pressed powder of a housing-forming powder-metallurgical material and an inner hard-phase layer delimiting said chambers and composed of hot isostatically pressed hard-phase powder-metallurgical material, and a diffusion layer between said inner and outer layers and bonded thereto, said inner and outer layers having isotropic lattice structures of powder-metallurgical origin with hot-isostatic-pressing texture.

2. The extruder housing part defined in claim 1 wherein said diffusion layer comprises a metallic partition between said inner and outer layers and into which both said housing-forming and hard-phase powder-metallurgical material is diffused.

3. The extruder housing part defined in claim 1 wherein said chambers are conical to receive respective conical worms.

4. The extruder housing part defined in claim 1 wherein said hard-phase layer extends over the full length of said part with substantially a constant thickness.

5. The extruder housing part defined in claim 1 wherein said housing part is joined end-to-end with another housing part having corresponding layers in forming said housing.

* * * * *